US012564926B2

(12) United States Patent
Li

(10) Patent No.: US 12,564,926 B2
(45) Date of Patent: Mar. 3, 2026

(54) OUTPUT ENERGY ADJUSTABLE GAS SPRING FASTENER DRIVE TOOL

(71) Applicant: Jing Li, Qianjiang (CN)

(72) Inventor: Jing Li, Qianjiang (CN)

( * ) Notice: Subject to any disclaimer, the term of this patent is extended or adjusted under 35 U.S.C. 154(b) by 0 days.

(21) Appl. No.: 19/235,832

(22) Filed: Jun. 12, 2025

(65) Prior Publication Data

US 2025/0303541 A1 Oct. 2, 2025

(51) Int. Cl.
*B25C 1/04* (2006.01)
*B25C 1/06* (2006.01)

(52) U.S. Cl.
CPC ................ *B25C 1/047* (2013.01); *B25C 1/06* (2013.01)

(58) Field of Classification Search
None
See application file for complete search history.

(56) References Cited

U.S. PATENT DOCUMENTS 2,821,170 A * 1/1958 Jacobus .................... B25C 1/04 91/20
10,967,491 B2 * 4/2021 Yasutomi .................. B25C 1/06
12,134,173 B2 * 11/2024 Hietpas ................... B25C 1/047

FOREIGN PATENT DOCUMENTS

JP H0362634 U * 6/1991
WO WO-2016158130 A1 * 10/2016 ............... B25C 1/06

OTHER PUBLICATIONS

JP-H0362634-U machine translation to English from PE2Esearch (Year: 2025).*
WO-2016158130-A1 machine translation to English from PE2Esearch (Year: 2025).*

* cited by examiner

*Primary Examiner* — Michael Quandt
(74) *Attorney, Agent, or Firm* — Daniel M. Cohn; Howard M. Cohn

(57) ABSTRACT

The invention discloses an output energy adjustable gas spring fastener drive tool, comprising a housing; a control circuit board, which is arranged in the housing and used for receiving and outputting signals; a trigger, which is arranged on the housing and used for the operation of the drive tool; a first cylinder block assembly, which comprises a first cylinder barrel for storing compressed gas, a piston arranged in the first cylinder barrel and a drive blade arranged on the piston; a second cylinder barrel, which is used for storing compressed gas; a pressure regulating device, which comprises a one-way channel and an adjustable check valve; the one-way channel is used for the compressed gas in the first cylinder barrel to flow towards the second cylinder barrel; the adjustable check valve is used for the compressed gas in the second cylinder barrel to flow towards the first cylinder barrel.

3 Claims, 17 Drawing Sheets

OUTPUT ENERGY ADJUSTABLE GAS SPRING FASTENER DRIVE TOOL

TECHNICAL FIELD

The invention relates to the technical field of power tools, in particular to an output energy adjustable gas spring fastener drive tool.

BACKGROUND ART

The traditional gas spring nail ejector usually adopts a single-cylinder structure and relies on compressed gas to directly drive the piston and drive blade to complete driving. However, this design has the following problems:

Fixed output energy: The energy output of traditional tools is not adjustable. As a result, when dealing with different materials such as cork, hard concrete and metal, either the penetration force is insufficient, resulting in failure to drive the nail in, or the impact force is excessive, causing the material to crack or deform.

Low energy utilization rate: The gas release process of the single-cylinder structure is uncontrollable, and the output energy is fixed and cannot be adjusted. As a result, the energy output is always the maximum when driving the shortest nail, causing relatively large energy waste.

Short service life: Due to the fixed output energy, the number of impacts of each gas spring nail gun is usually tens of thousands. However, because its output energy is fixed, it causes impact damage to the components of the entire tool during each use, reducing the service life and performance of the entire tool.

Therefore, it is necessary to make improvements to this.

SUMMARY OF THE INVENTION

In view of the defects existing in the prior art, the invention provides an output energy adjustable gas spring fastener drive tool in order to solve the problems raised in the prior art.

To solve the above technical problems, the invention adopts the following technical proposal: an output energy adjustable gas spring fastener drive tool comprises a housing, which is provided with an installation space for accommodating mechanical components; a control circuit board, which is arranged in the housing and used for receiving and outputting signals; a trigger, which is arranged on the housing and used for the operation of the drive tool; a first cylinder block assembly, which comprises a first cylinder barrel for storing compressed gas, a piston arranged in the first cylinder barrel and a drive blade arranged on the piston; a second cylinder barrel, which is used for storing compressed gas; a pressure regulating device, which comprises a one-way channel and an adjustable check valve; the one-way channel is arranged between the first cylinder barrel and the second cylinder barrel and used for the compressed gas in the first cylinder barrel to flow towards the second cylinder barrel; the adjustable check valve is arranged between the first cylinder barrel and the second cylinder barrel and used for the compressed gas in the second cylinder barrel to flow towards the first cylinder barrel.

Further, the one-way channel comprises through holes arranged around the inner wall of the upper end of the first cylinder barrel and a sealing sleeve arranged on the outer wall of the upper end of the first cylinder barrel; when the pressure of the compressed gas in the first cylinder barrel is greater than that in the second cylinder barrel, the compressed gas in the first cylinder barrel opens the sealing sleeve and enters the second cylinder barrel.

Further, the adjustable check valve comprises a first valve body, a first valve core arranged in the first valve body, a first spring arranged at the end of the first valve core and a first adjusting knob arranged at the end of the first valve core; the first valve body is provided with a valve hole connected with a second cylinder body, a threaded section is arranged at the upper end of the first valve core, the first spring is sleeved on the first valve core, and the first adjusting knob is threadedly connected to the threaded section; the first adjusting knob is driven by an external force to adjust and compress the first spring, thereby changing the cracking pressure exerted by the first valve core relative to the first valve body.

Further, the first cylinder barrel and the second cylinder barrel are arranged at intervals; alternatively, the second cylinder barrel is sleeved on the first cylinder barrel.

Further, the output energy adjustable gas spring fastener drive tool comprises a lifting mechanism, which is arranged in the housing; the lifting mechanism comprises a motor, a gearbox connected to the output end of the motor, a lifter connected to the gearbox, and a baffle arranged on the end face of the lifter; first clamping teeth distributed at intervals are arranged on the first side of the drive blade, the lifter is provided with a clamping corner engaged with the first clamping teeth and a notch for avoiding the linear movement of the drive blade from the top-dead-center (TDC) position to the bottom-dead-center (BDC) position under the action of compressed gas at the circumferential edge; a photoelectric sensor fitted with the baffle is arranged in the housing.

Further, the output energy adjustable gas spring fastener drive tool comprises a latch mechanism, which is arranged on one side of the lifter; a cam lobe protruding along the radial direction is arranged at the lower part of the lifter; second clamping teeth distributed at intervals are arranged on the second side of the drive blade; the latch mechanism comprises a latch fixing plate installed in the housing, a latch body installed on the latch fixing plate, a latch transmission arm installed on the latch body, and a torsion spring arranged between the latch body and the latch transmission arm; the latch body can rotate relative to the latch fixing plate, and at least part of the latch body extends to the second clamping teeth; the latch transmission arm is fixedly connected to the latch body, and the latch transmission arm extends to the cam lobe; when the cam lobe rotates and moves along with the lifter to drive the drive blade, the cam lobe pushes the latch transmission arm to disengage the latch body from the second clamping teeth and compresses the torsion spring; after the drive blade is activated, the cam lobe rotates and moves along with the lifter to disengage from the latch transmission arm, and the torsion spring drives the latch body to return to the original position.

Further, the output energy adjustable gas spring fastener drive tool comprises a fastener feeding mechanism, which is connected to the housing and used to place strip fasteners and move the strip fasteners to the position that coincides with the path of the drive blade.

Further, the output energy adjustable gas spring fastener drive tool comprises a battery used for supplying power; the battery is arranged in the housing; alternatively, the battery is detachably connected to the housing.

Compared with the prior art, the invention has the following beneficial effects:

Flexible and adjustable energy output: a dual-cylinder design (the first cylinder barrel and the second cylinder barrel) is combined with the pressure regulating device (one-way channel and adjustable check valve) to achieve the directional flow of compressed gas between the cylinders and the dynamic pressure regulation, thereby precisely controlling the driving energy of the drive blade and adapting to the requirements of different hardness materials or working conditions (such as cork, hard concrete, etc.). The adjustable check valve offers multiple implementation methods (mechanical knob, magnetic force regulation, electromagnetic control) to meet the regulation requirements of different scenarios (such as manual quick regulation or automatic control).

Structure optimization and reliability enhancement: the one-way channel adopts a combined design of through holes and sealing sleeves and only allows high-pressure gas to flow in one direction, thereby ensuring the stable energy storage of the second cylinder barrel and avoiding energy loss caused by gas backflow. The cylinder layout is flexible: The first cylinder barrel and the second cylinder barrel can be arranged at intervals or nested to optimize the space utilization rate and meet the size requirements of different tools.

The latch mechanism locks the drive blade with the latch body through the linkage between the cam lobe and the latch transmission arm. The drive blade is in a non-driving state, and the cam lobe drives the latch transmission arm to rotate. After the latch body is driven, the limit is released to ensure the reliability of the driving process. Meanwhile, in the event of nail blockage or jamming, the latch body can be engaged with the second latch teeth to prevent accidental driving, and by use of this configuration, the drive could only move a short distance even the jamming is suddenly cleared, ensuring safer use.

Figure 1:
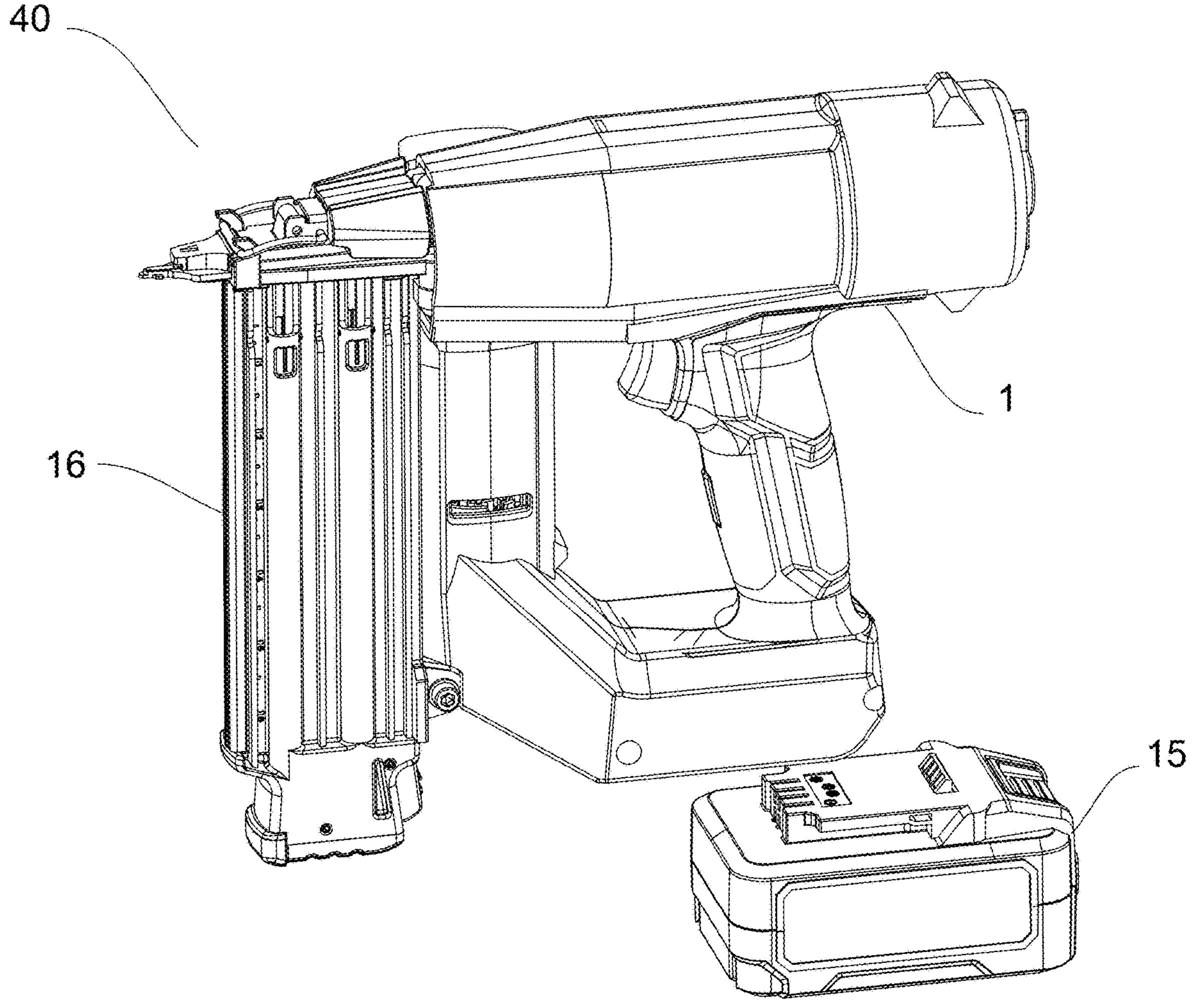
FIG. 1 is the structure diagram of the invention.
Figure 2:
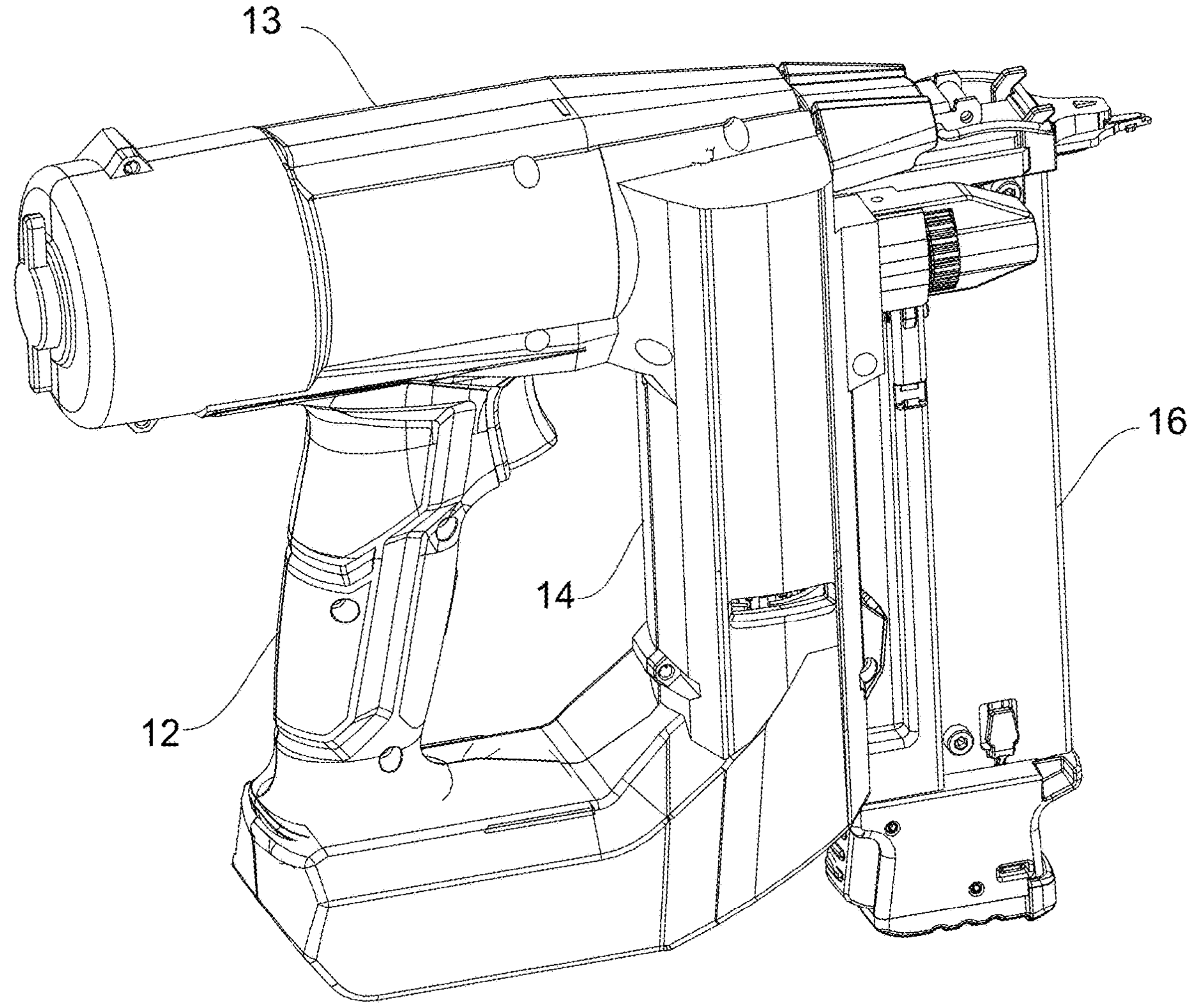
FIG. 2 is the structure diagram of the invention at another angle.
Figure 3:
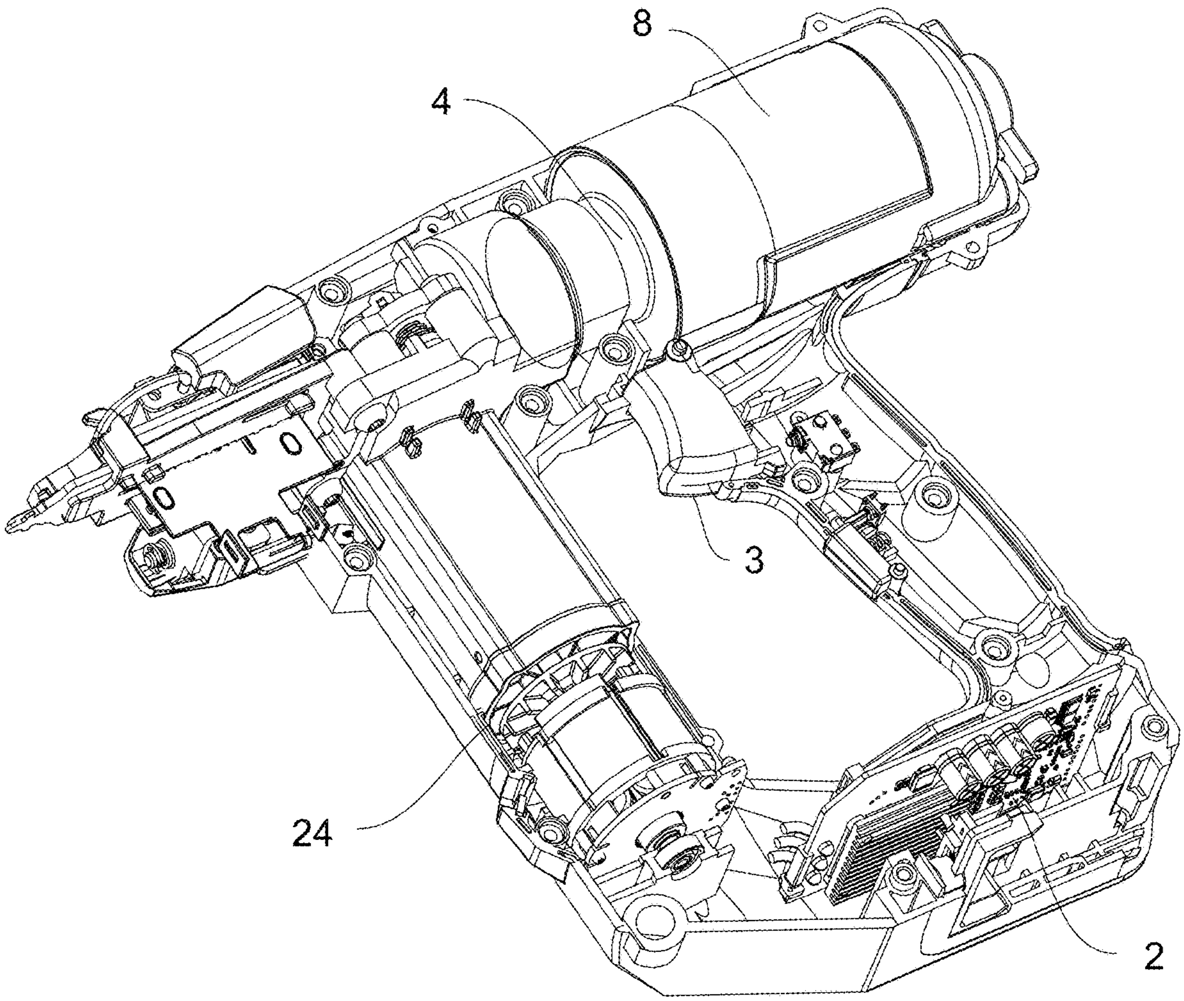
FIG. 3 is the internal structure diagram of the housing.
Figure 4:
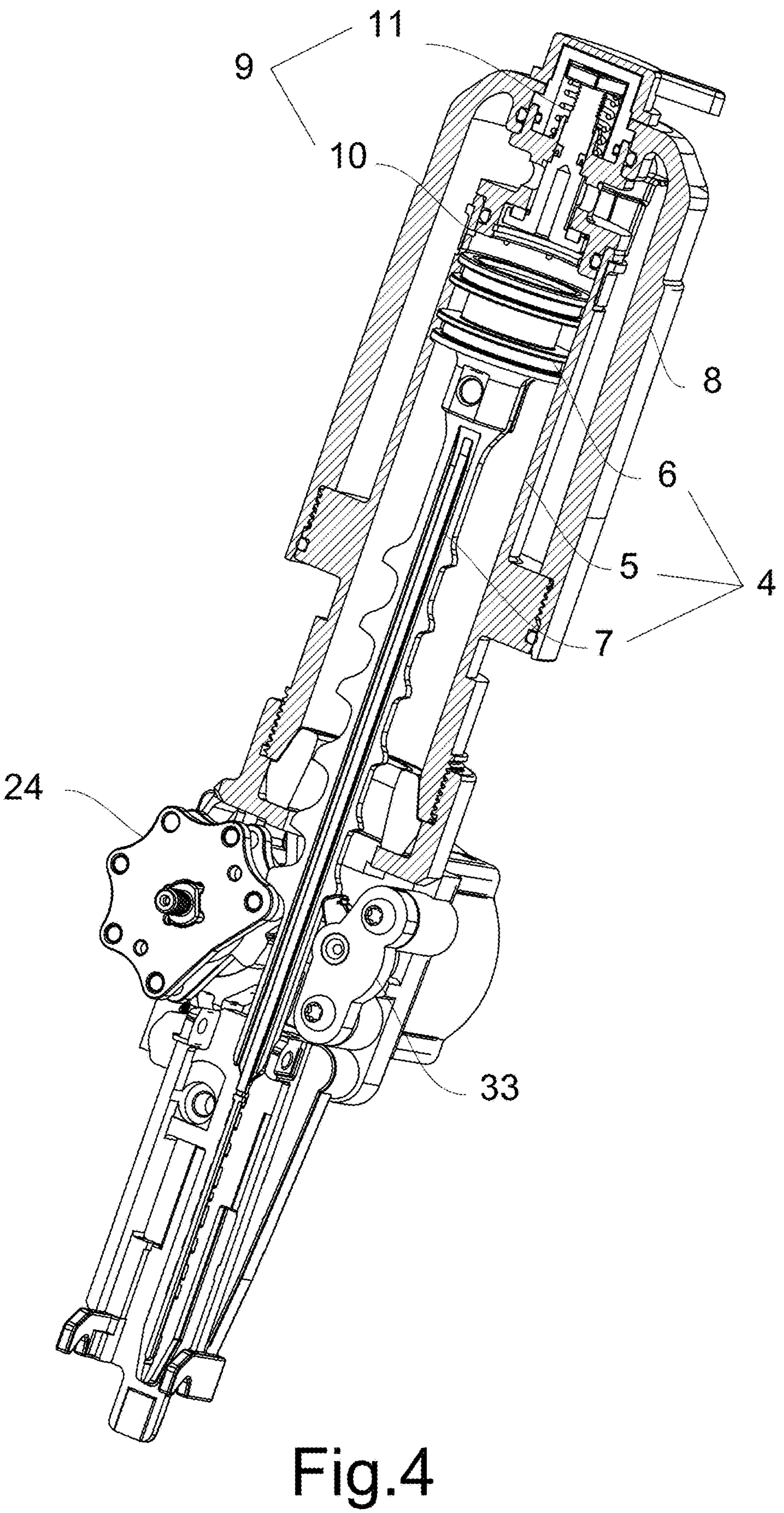
FIG. 4 is the partial structure diagram of the invention.

Reference signs: 1. Housing; 2. Control circuit board; 3. Trigger; 4. First cylinder block assembly; 5. First cylinder barrel; 6. Piston; 7. Drive blade; 8. Second cylinder barrel; 9. Pressure regulating device; 10. One-way channel; 11. Adjustable check valve; 12. Handle; 13. Cylinder housing; 14. Motor housing; 15. Battery; 16. fastener feeding mechanism; 17. Through hole; 18. Sealing sleeve; 19. First valve body; 20. First valve core; 21. First spring; 22. First adjusting knob; 23. Valve hole; 24. Lifting mechanism; 25. Motor; 26. Gearbox; 27. Lifter; 28. Baffle; 29. First clamping tooth; 30. Clamping corner; 31. Notch; 32. Photoelectric sensor; 33. Latch mechanism; 34. Cam lobe; 35. Second clamping tooth; 36. Latch fixing plate; 37. Latch body; 38. Latch transmission arm; 39. Torsion spring; 40. Nailing machine.

DETAILED DESCRIPTION OF THE INVENTION

The following provides a further detailed description of the invention in combination with the drawings.

In view of the technical issues in the prior art, as shown in FIG. 1 to FIG. 17, the invention provides an output energy adjustable gas spring fastener drive tool, comprising a housing 1, which is provided with an installation space for accommodating mechanical components; a control circuit board 2, which is arranged in the housing 1 and used for receiving and outputting signals; a trigger 3, which is arranged on the housing 1 and used for the operation of the drive tool; a first cylinder block assembly 4, which comprises a first cylinder barrel 5 for storing compressed gas, a piston 6 arranged in the first cylinder barrel 5 and a drive blade 7 arranged on the piston 6; a second cylinder barrel 8, which is used for storing compressed gas; a pressure regulating device 9, which comprises a one-way channel 10 and an adjustable check valve 11; the one-way channel 10 is arranged between the first cylinder barrel 5 and the second cylinder barrel 8 and used for the compressed gas in the first cylinder barrel 5 to flow towards the second cylinder barrel 8; the adjustable check valve 11 is arranged between the first cylinder barrel 5 and the second cylinder barrel 8 and used for the compressed gas in the second cylinder barrel 8 to flow towards the first cylinder barrel 5.

In the above technical proposal, the output energy adjustable gas spring fastener drive tool is designed to drive a fastener to be fired onto the workpiece, wherein the fastener can be a nail, pin, staple, etc.

The housing 1 is made of high-strength engineering plastics and used to accommodate mechanical components and circuit components. The housing 1 consists of a handle portion 12, a cylinder housing portion 13 and a motor housing portion 14. The control circuit board 2 is arranged at the bottom of the handle portion 12, serves as an intelligent hub of the tool and realizes automatic control by receiving, processing and outputting signals. The trigger 3 is installed at the gun gripping part of the housing 1. The handle is designed to be easy for human hands to grasp. The trigger 3 is designed so that human fingers can perform linear operation when grasping the handle When the user pulls the trigger 3, the control circuit board 2 is activated to start the drive tool to drive the fastener to work; a detachable battery 15 can be installed at the lower part of the handle portion 12 for easy replacement and use; alternatively, the battery 15 can be installed inside the housing 1 and charged by connecting the charger, or the power can be supplied to drive the tool by connecting the power cable to the socket. The fastener feeding mechanism 16 is arranged at the front side of the grip to convey an individual fastener (nail) from a magazine to the position of the drive blade 7. In the embodiments shown, the fastener feeding mechanism 16 positions the fastener at the position that coincides with the path of the drive blade 7. Thus, when the drive blade 7 performs the driving stroke, the driving end thereof basically impacts the fastener for emission and conveys the fastener to the outlet end of the tool. Since the fastener feeding mechanism 16 is not an improvement of this technical proposal, the structure of the fastener feeding mechanism 16 available on the market can be referred to for implementation. There is no need to elaborate further on this.

The first cylinder assembly 4 comprises the first cylinder barrel 5, the piston 6 and the drive blade 7, wherein the drive blade 7 is installed on the piston 6, the piston 6 is arranged inside the first cylinder barrel 5, and the outer peripheral wall of the piston 6 is in contact with the inner wall of the first cylinder barrel 5. The front end of the first cylinder barrel 5 is the direction in which the piston 6 moves forward. A cavity formed at the front end of the first cylinder barrel 5 is in connection with the outside. The rear end of the first cylinder barrel 5 is in the direction where the piston 6 moves backward. The cavity formed at the rear end of the first cylinder barrel 5 is in no connection with the outside, and compressed gas is stored in the cavity at the rear end of the first cylinder barrel 5.

The second cylinder assembly comprises the second cylinder barrel 8, in which compressed gas is stored. The second cylinder barrel 8 can be arranged at the rear end of the first cylinder barrel 5 or wrapped around the first cylinder barrel 5. When the second layout is adopted, the overall structure is compact and small, occupying less space and being more suitable for use. Therefore, the second layout is preferred.

A one-way channel 10 is arranged between the first cylinder assembly 4 and the second cylinder assembly 8. The one-way channel 10 is designed to allow only the compressed gas in the first cylinder barrel 5 to enter the second cylinder barrel 8, that is, the compressed gas in the first cylinder barrel 5 enters the second cylinder barrel 8 through the one-way channel 10 when the air pressure in the first cylinder barrel 5 is greater than that in the second cylinder barrel 8, and until the air pressure in the first cylinder 5 and the second cylinder 8 tends to be the same, the one-way channel 10 closes. The one-way channel 10 can be composed of a check valve or a similar mechanism with one-way flow function. A component that enables the compressed gas in the first cylinder barrel 5 to enter the second cylinder barrel 8 based on the pressure difference can be regarded as a one-way channel 10. An adjustable check valve 11 is arranged between the first cylinder assembly 4 and the second cylinder barrel 8. The adjustable check valve 11 is designed to only allow the compressed gas in the second cylinder barrel 8 to enter. The adjustable check valve 11 is used to adjust the opening pressure. When the air pressure in the second cylinder barrel 8 is greater than that in the first cylinder barrel 5 and the thrust of the pressure difference acting on the adjustable check valve 11 is greater than the opening pressure of the adjustable check valve 11, the adjustable check valve 11 is opened. The compressed gas in the second cylinder barrel 8 enters the first cylinder barrel 5 to replenish the gas energy in the first cylinder barrel 5. Since the adjustable check valve 11 is capable of adjusting the opening pressure, the amount of compressed gas in the second cylinder barrel 8 flowing into the first cylinder barrel 5 can be controlled, thereby controlling the output energy.

By adopting the above technical proposal, a dual-cylinder design (the first cylinder barrel 5 and the second cylinder barrel 8) is combined with the pressure regulating device 9 (one-way channel 10 and adjustable check valve 11) to achieve the directional flow of compressed gas between the cylinders and the dynamic pressure regulation, thereby precisely controlling the driving energy of the drive blade 7 and adapting to the requirements of different hardness materials or working conditions (such as cork, hard concrete, etc.). When dealing with relatively soft materials in use, the user can regulate larger opening pressure through the adjustable check valve 11, thereby allowing less compressed gas to enter the first cylinder barrel 5 to replenish gas energy in the first cylinder barrel 5, reducing the output energy and meeting the usage requirements; when dealing with harder materials, the user can regulate smaller opening pressure through the adjustable check valve 11, thereby allowing more compressed gas to enter the first cylinder barrel 5 to replenish gas energy in the first cylinder barrel 5, increasing the output energy and meeting the usage requirements.

However, since the output energy of the tool is adjustable, the output energy can be reduced in usage scenarios with smaller output energy, reducing the impact damage to the components of the entire tool and thereby extending the lifespan and performance of the entire tool.

Figure 5:
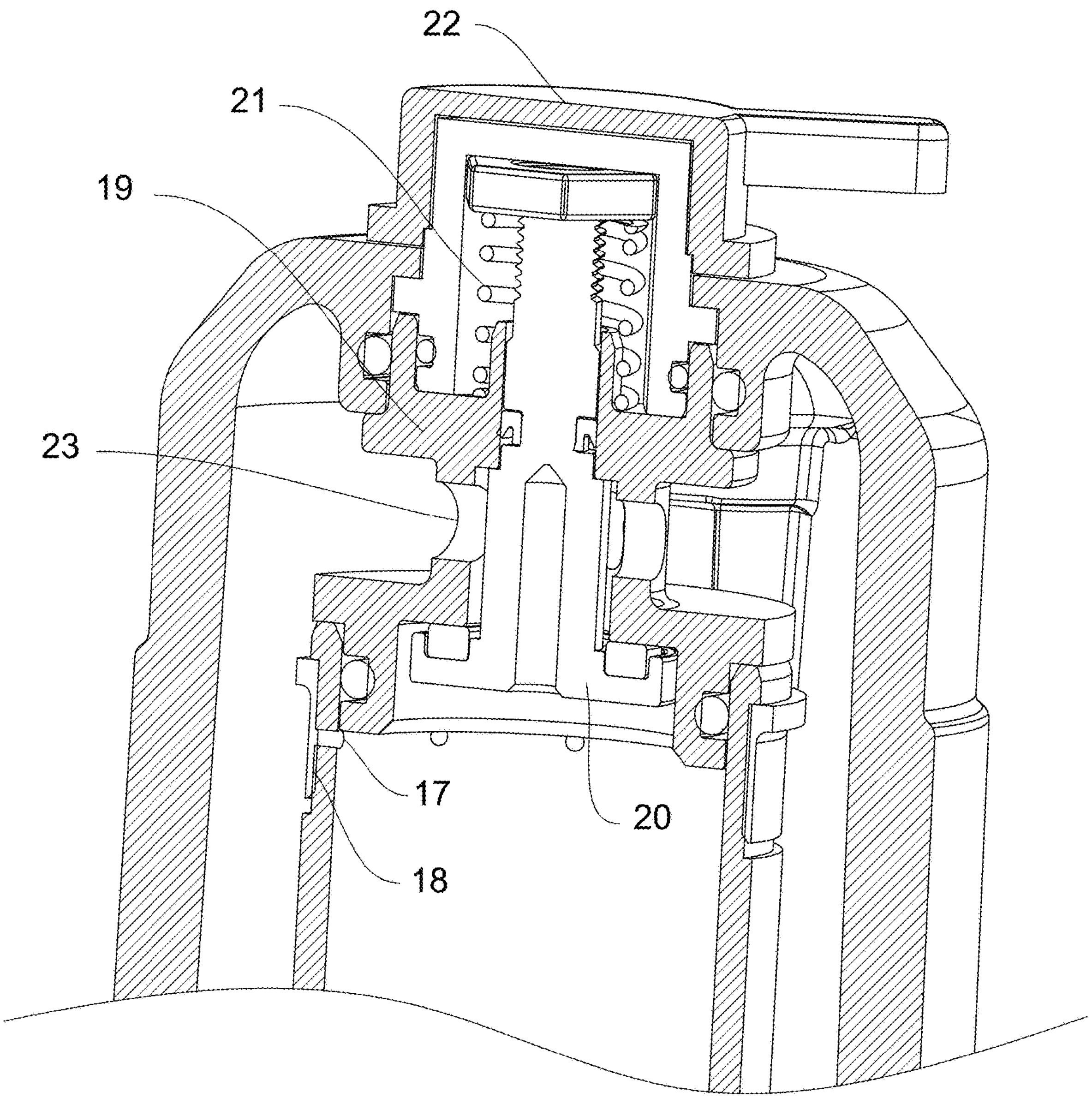
FIG. 5 is the structure diagram of the pressure regulating device.
Figure 6:
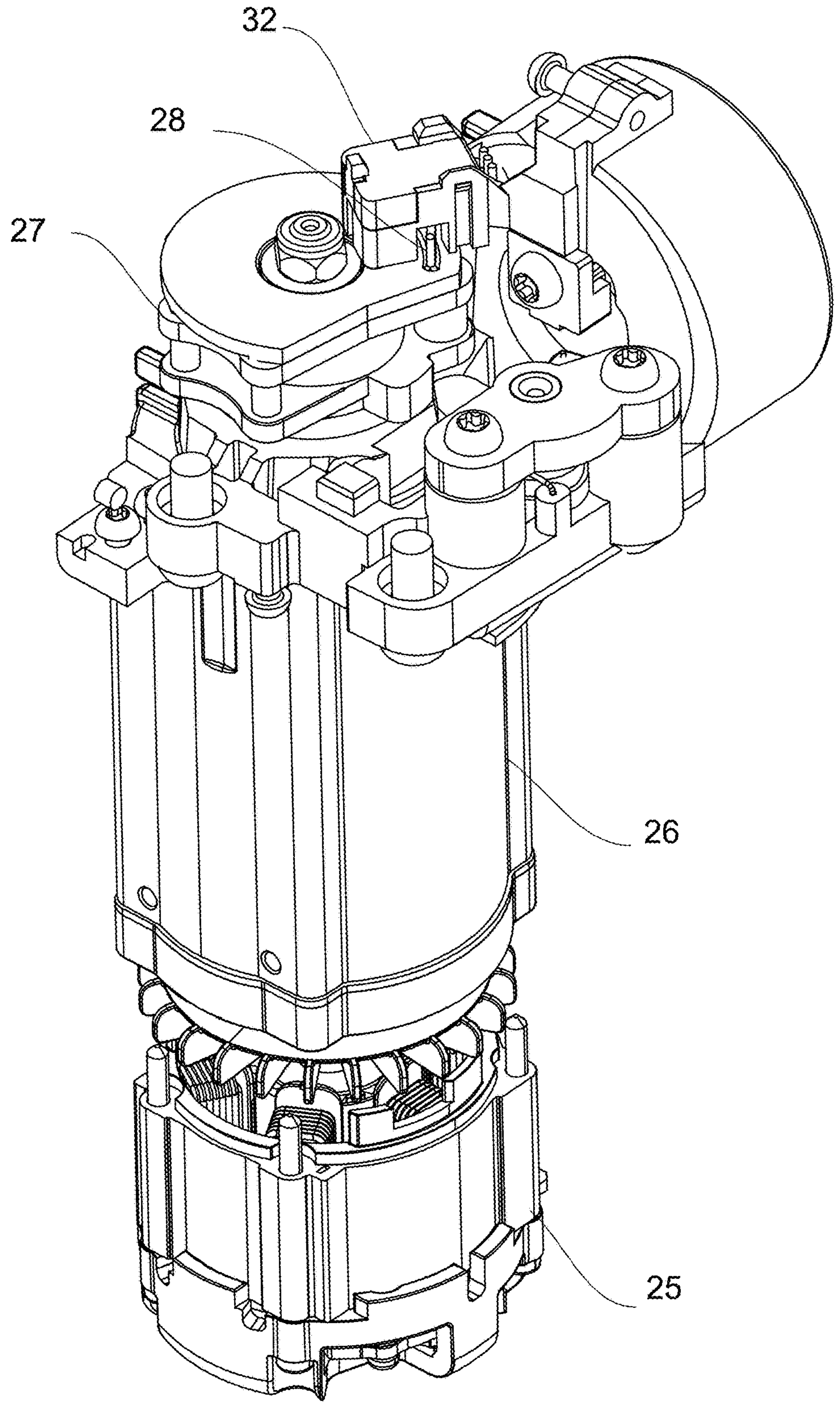
FIG. 6 is the structure diagram of the lifting mechanism.
Figure 7:
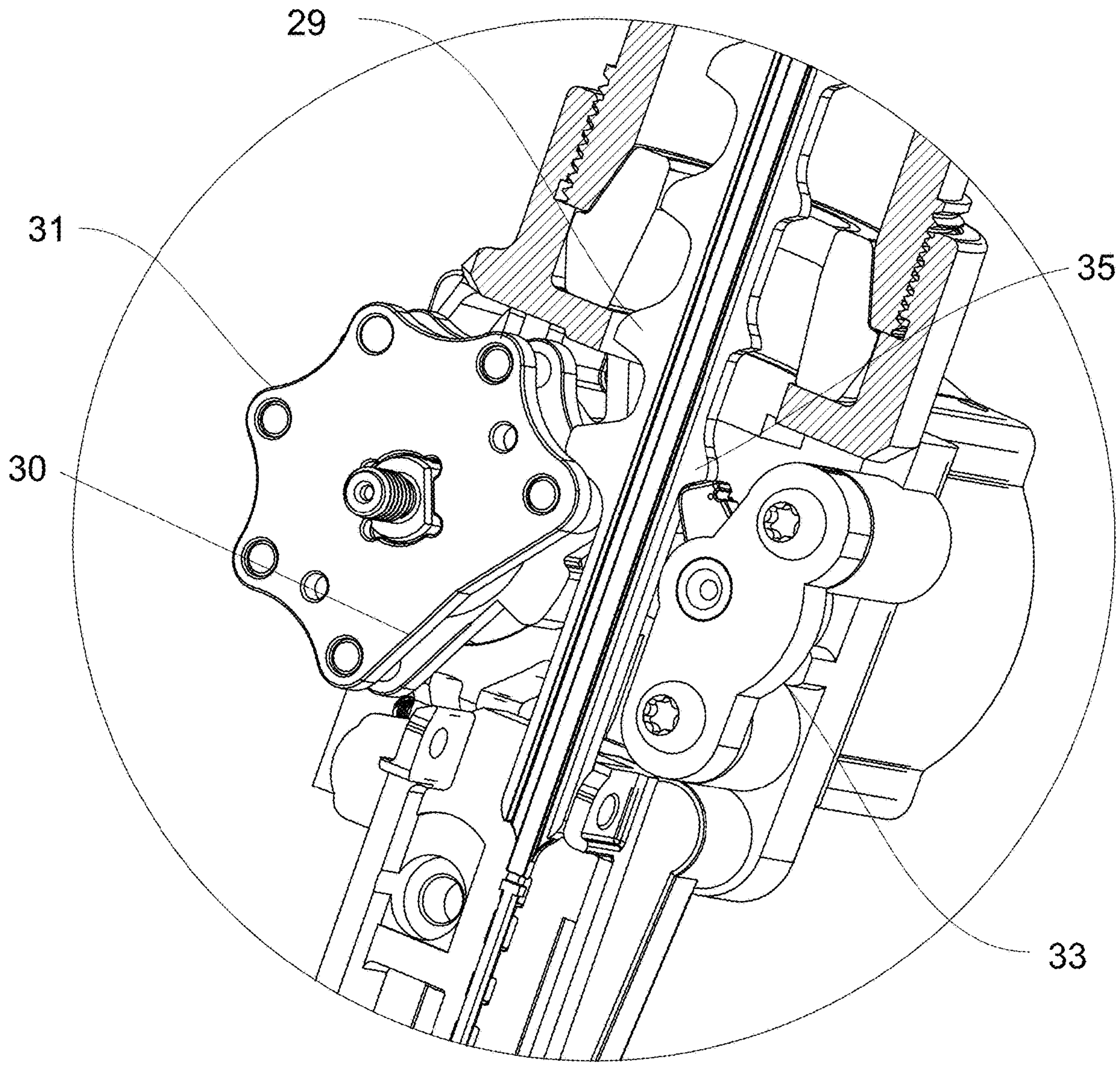
FIG. 7 is the partial enlarged structure diagram of FIG. 4.
Figure 8:
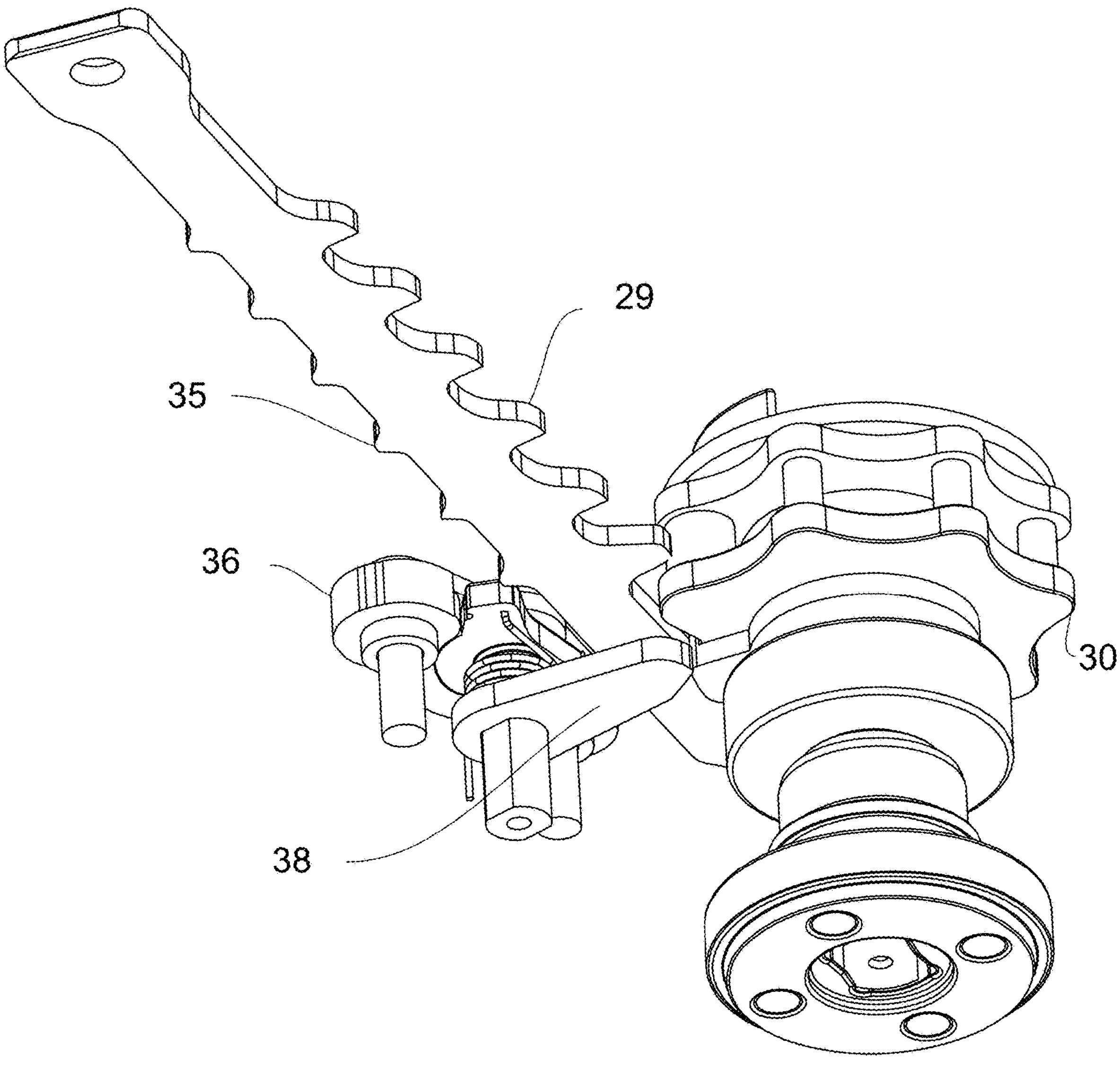
FIG. 8 is the structure diagram of the latch mechanism and the lifter.

As shown in FIG. 5, the one-way channel 10 comprises through holes 17 arranged around the inner wall of the upper end of the first cylinder barrel 5 and a sealing sleeve 18 arranged on the outer wall of the upper end of the first cylinder barrel 5; when the pressure of the compressed gas in the first cylinder barrel 5 is greater than that in the second cylinder barrel 8, the compressed gas in the first cylinder barrel 5 opens the sealing sleeve 18 and enters the second cylinder barrel 8.

As an implementable technical proposal, the second cylinder barrel 8 is wrapped around the first cylinder 5 in the implementation. The one-way channel 10 comprises through holes 17 arranged around the inner wall of the upper end of the first cylinder barrel 5 and a sealing sleeve 18 arranged on the outer wall of the upper end of the first cylinder barrel 5. Since the second cylinder barrel 8 is wrapped around the first cylinder barrel 5, the outer wall of the first cylinder barrel 5 can be used as the inner wall of the second cylinder barrel 8. The through holes 17 are arranged at the rear end of the first cylinder barrel 5. The number of through holes 17 depends on the specific implementation conditions. The through holes 17 run through the first cylinder barrel 5 and the second cylinder barrel 8. The sealing sleeve 18 is sleeved on the outer wall at the through holes 17 and used to cover the through holes 17.

The specific use process is as follows: when the air pressure in the first cylinder barrel 5 is greater than that in the second cylinder barrel 8, the compressed gas passes through the through holes 17 and opens the sealing sleeve 18 to enter the second cylinder barrel 8; when the air pressure in the first cylinder barrel 5 is equal to or less than that in the second cylinder barrel 8, the sealing sleeve 18 is in close contact with the through holes 17, and the compressed gas in the first cylinder barrel cannot enters the second cylinder barrel 8 through the through holes 17, thus enabling the compressed gas in the first cylinder barrel 5 to flow unidirectionally to the second cylinder barrel 8.

As shown in FIG. 5, the adjustable check valve 11 comprises a first valve body 19, a first valve core 20 arranged in the first valve body 19, a first spring 21 arranged at the end of the first valve core 20 and a first adjusting knob 22 arranged at the end of the first valve core 20; the first valve body 19 is provided with a valve hole 23 connected with a second cylinder body, a threaded section is arranged at the upper end of the first valve core 20, the first spring 21 is sleeved on the first valve core 20, and the first adjusting knob 22 is threadedly connected to the threaded section; the first adjusting knob 22 is driven by an external force to adjust and compress the first spring 21, thereby changing the cracking pressure exerted by the first valve core 20 relative to the first valve body 19.

The above provides the structure of the implementable adjustable check valve 11, which is used to achieve the unidirectional flow of the compressed gas in the second cylinder barrel 8 to the first cylinder barrel 5 and enable the first cylinder barrel 5 and the second cylinder barrel 8 to form two independent and unconnected cavities.

The adjustable check valve 11 consists of a first valve body 19, a first valve core 20, a first spring 21 and a first adjusting knob 22. The first valve core 20 can move within the first valve body 19 to open or close the airway leading to the second cylinder barrel 8 to the first cylinder barrel 5. The specific usage process is as follows: a threaded section is arranged at the upper end of the first valve core 20, a nut that fits the threaded section is arranged inside the first adjusting knob 22, the root of the threaded section is the bottom-dead-center (BDC) of the nut stroke of the first adjusting knob 22, and the top of the threaded section is the top-dead-center (TDC) of the nut stroke of the first adjusting knob 22. The first spring 21 is sleeved on the first valve core 20 and located between the valve body and the nut of the first adjusting knob 22, the first adjusting knob 22 embraces the first spring 21, the nut and the top of the first valve core 20. The user can rotate the first adjusting knob 22 to drive the nut to rotate, making it move on the threaded section.

It should also be understood that when the nut of the first adjusting knob 22 is moved to the bottom dead center of the stroke of the threaded section, the first spring 21 is compressed to the shortest length, generating and applying the maximum elastic force to the first valve core 20. At this time, the opening pressure of the adjustable check valve 11 is the maximum. When the nut of the first adjusting knob 22 is moved to the top dead center of the stroke of the threaded section, the first spring 21 is slightly compressed, generating and applying a very small elastic force to the first valve core 20. At this time, the opening pressure of the adjustable check valve 11 is the minimum.

In the above technical proposal, the user changes the position of the nut on the threaded section by turning the first adjusting knob 22 to alter the compression degree of the first spring 21, thereby changing the force exerted by the first spring 21 on the valve core, and achieving the opening pressure adjustment of the adjustable check valve 11. Thus, the amount of compressed gas introduced into the first cylinder barrel 5 from the second cylinder barrel 8 is achieved, and the output energy is regulated.

As shown in FIG. 6 to FIG. 9, the invention also comprises a lifting mechanism 24, which is arranged in the housing 1; the lifting mechanism 24 comprises a motor 25, a gearbox 26 connected to the output end of the motor 25, a lifter 27 connected to the gearbox 26, and a baffle 28 arranged on the end face of the lifter 27; first clamping teeth 29 distributed at intervals are arranged on the first side of the drive blade 7, the lifter 27 is provided with a clamping corner 30 engaged with the first clamping teeth 29 and a notch 31 for avoiding the linear movement of the drive blade 7 from the top-dead-center (TDC) position to the bottom-dead-center (BDC) position under the action of compressed gas at the circumferential edge; a photoelectric sensor 32 fitted with the baffle 28 is arranged in the housing 1.

The above tool has been used to drive a fastener (nail). Now, this tool must lift the drive blade 7 to return to the original highest position in order to perform a new driving action. This is achieved through the lifting mechanism 24. Specifically, the lifting mechanism 24 consists of a motor 25, a gearbox 26 and a baffle 28, wherein the motor 25 is electrically connected to the control circuit board 2, the gearbox 26 is connected to the output end of the motor 25, the gearbox 26 is connected to the lifting mechanism 27, and the lifting mechanism 27 is equipped with a baffle 28 and a photoelectric sensor 32 that sense and cooperate with each other.

The specific driving process is as follows: driven by the motor 25, the motor 25 transmits power to the gearbox 26, and the gearbox 26 transmits power to the lifter 27. When the lifter 27 rotates counterclockwise, the clamping corners 30 on the lifter 27 are engaged with the first clamping teeth 29 on the drive blade 7. The number of clamping corners 30 is the same as that of the first clamping teeth 29, thus facilitating the engagement of the clamping corner 30 between the first clamping teeth 29 to form a bayonet. Under the rotation of the lifter 27, the drive blade 7 is lifted upwards. When the baffle 28 on the upper surface of the lifter 27 rotates along with the lifter 27 to the middle of the photoelectric sensor 32, the baffle 28 blocks the light signal of the light source on the photoelectric sensor 32 from being transmitted to the receiving unit. When receiving the signal, the control circuit board 2 immediately cuts off the power supply to the motor 25. The motor 25 stops, and the drive blade 7 is not driven upwards any longer. At this time, the pressurized gas in the first cylinder barrel 5 pushes the piston 6 and the drive blade 7 downwards, and the drive blade 7 transmits the thrust to the lifter 27, thereby transmitting the thrust to the gearbox 26. The ratchet self-locking mechanism inside the gearbox 26 (not shown) prevents the lifter 27 from being pushed clockwise by the drive blade 7. The ratchet self-locking mechanism inside the gearbox 26 locks the lifter 27 and the drive blade 7 to the ready position. Thus, the drive blade 7 is driven by the counterclockwise rotation of the lifting mechanism 24 to reset.

Figure 9:
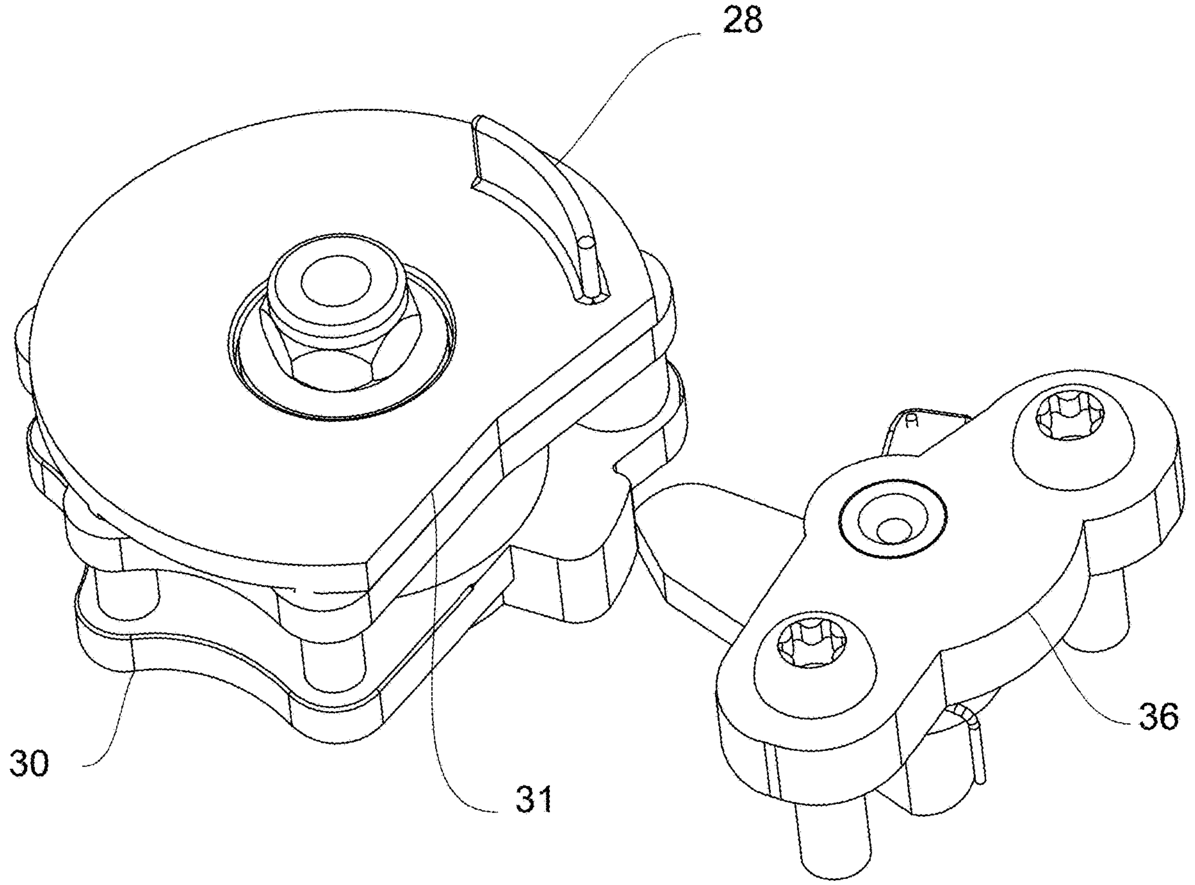
FIG. 9 is the structure diagram of the latch mechanism and the lifter.
Figure 10:
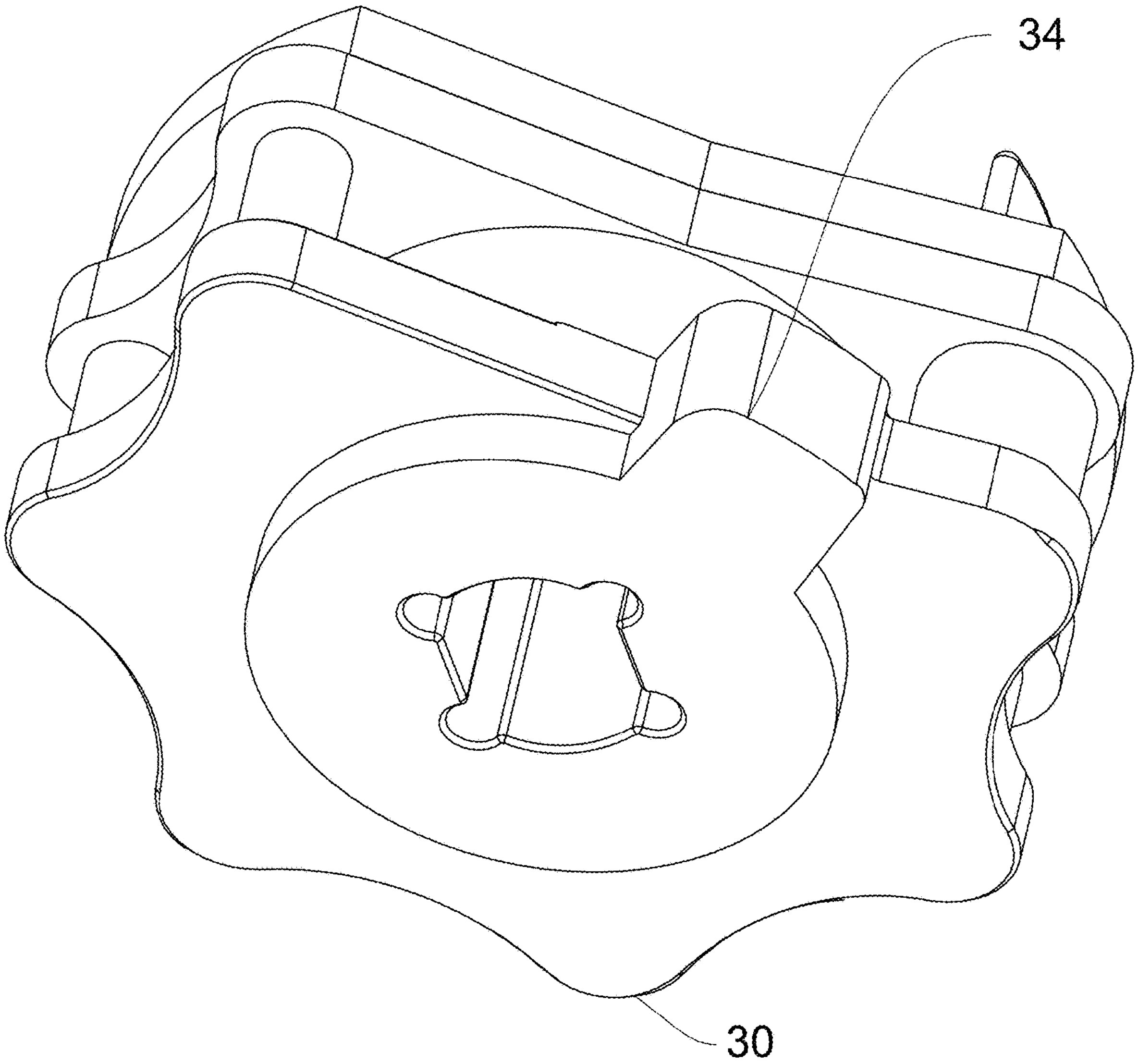
FIG. 10 is the structure diagram of the lifter.
Figure 11:
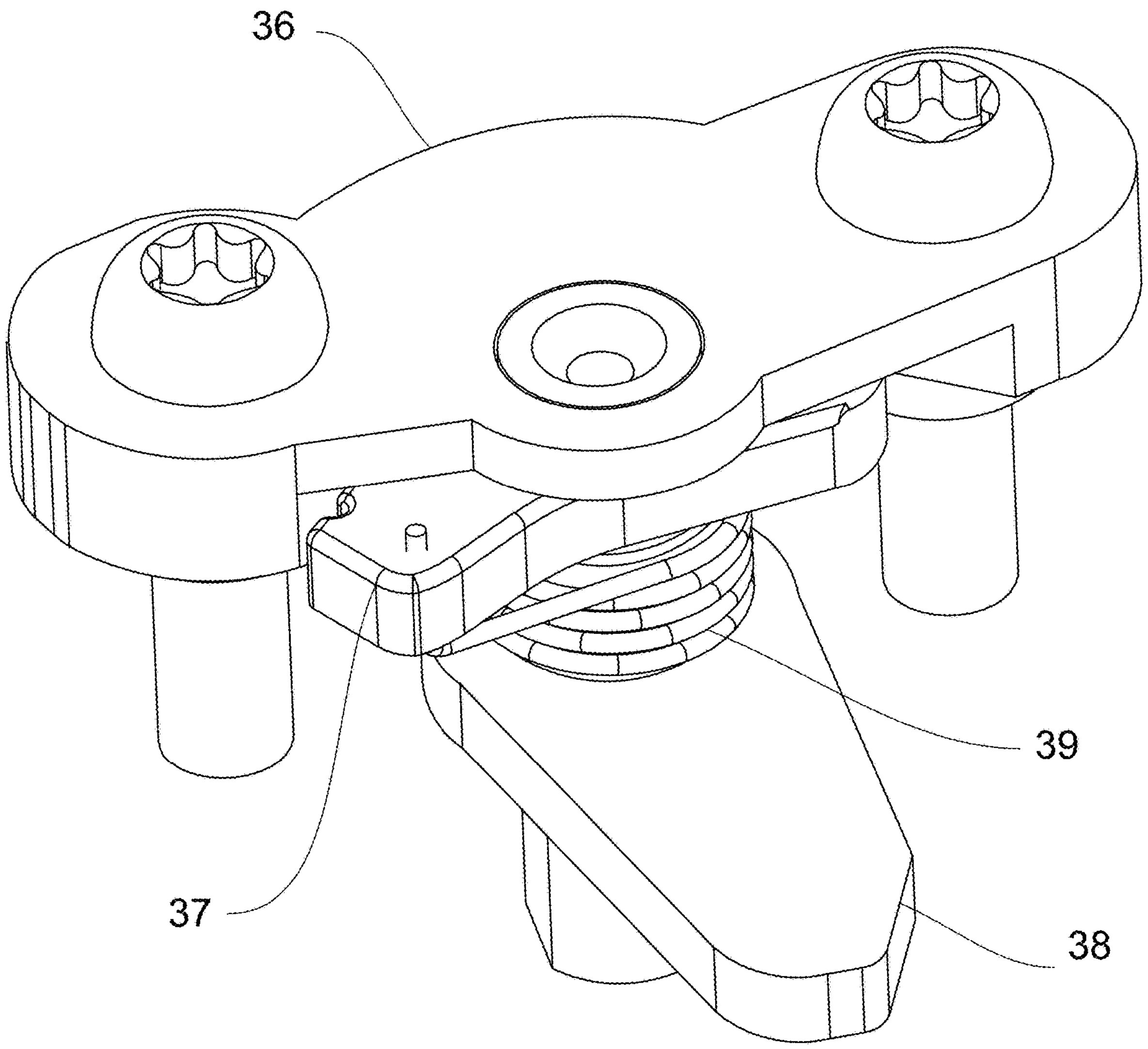
FIG. 11 is the structure diagram of the latch mechanism.
Figure 12:
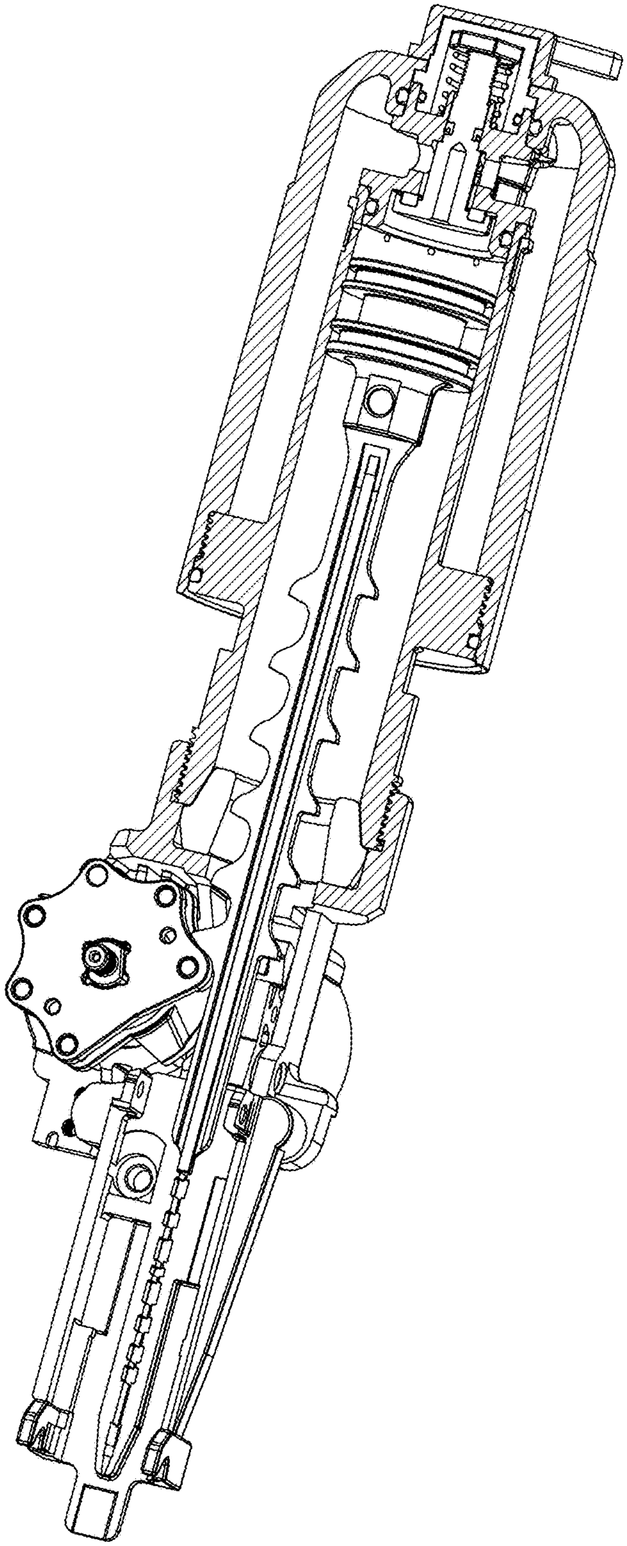
FIG. 12 is the schematic diagram of the invention in driving stand-by state.
Figure 13:
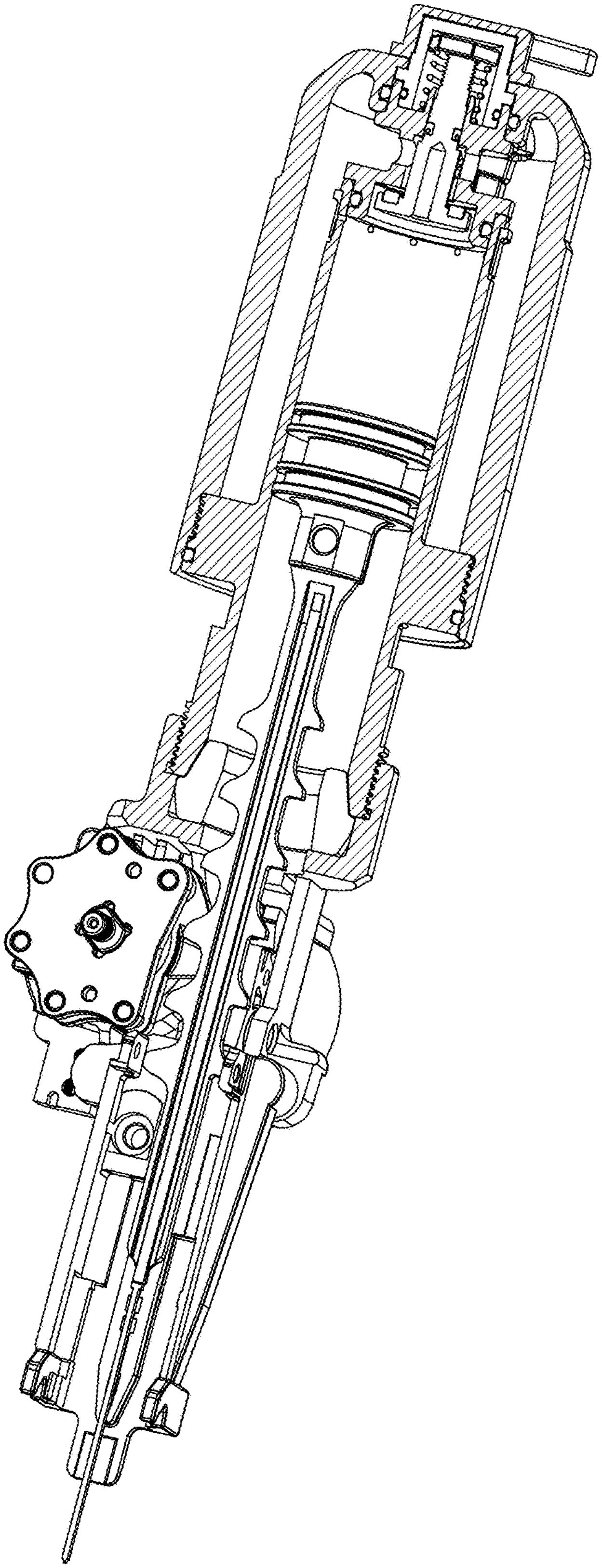
FIG. 13 is the schematic diagram of the invention in driving critical state.
Figure 14:
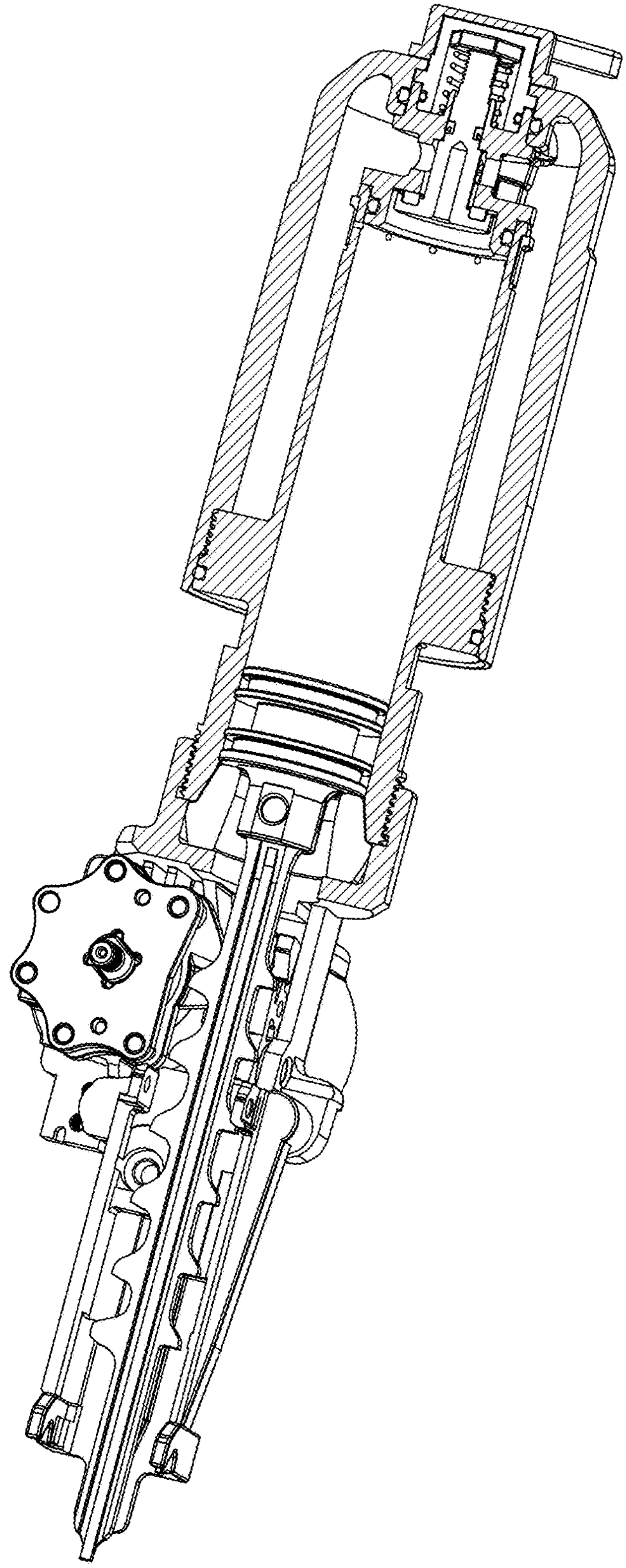
FIG. 14 is the schematic diagram of the invention in driving state.
Figure 15:
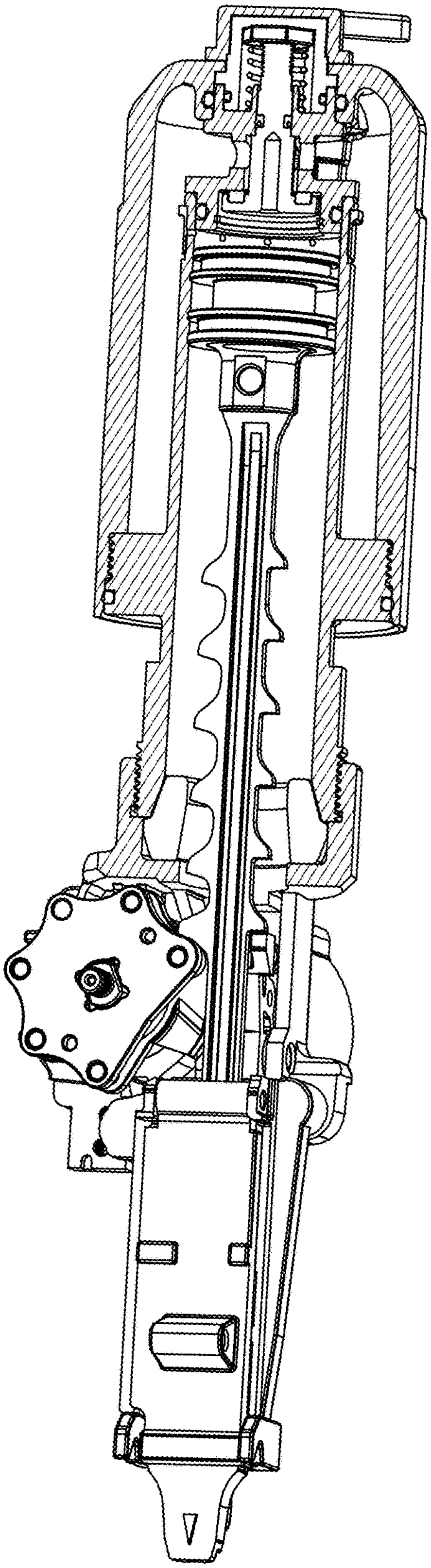
FIG. 15 is the schematic diagram of the invention in reset start state after the drive blade is driven.
Figure 16:
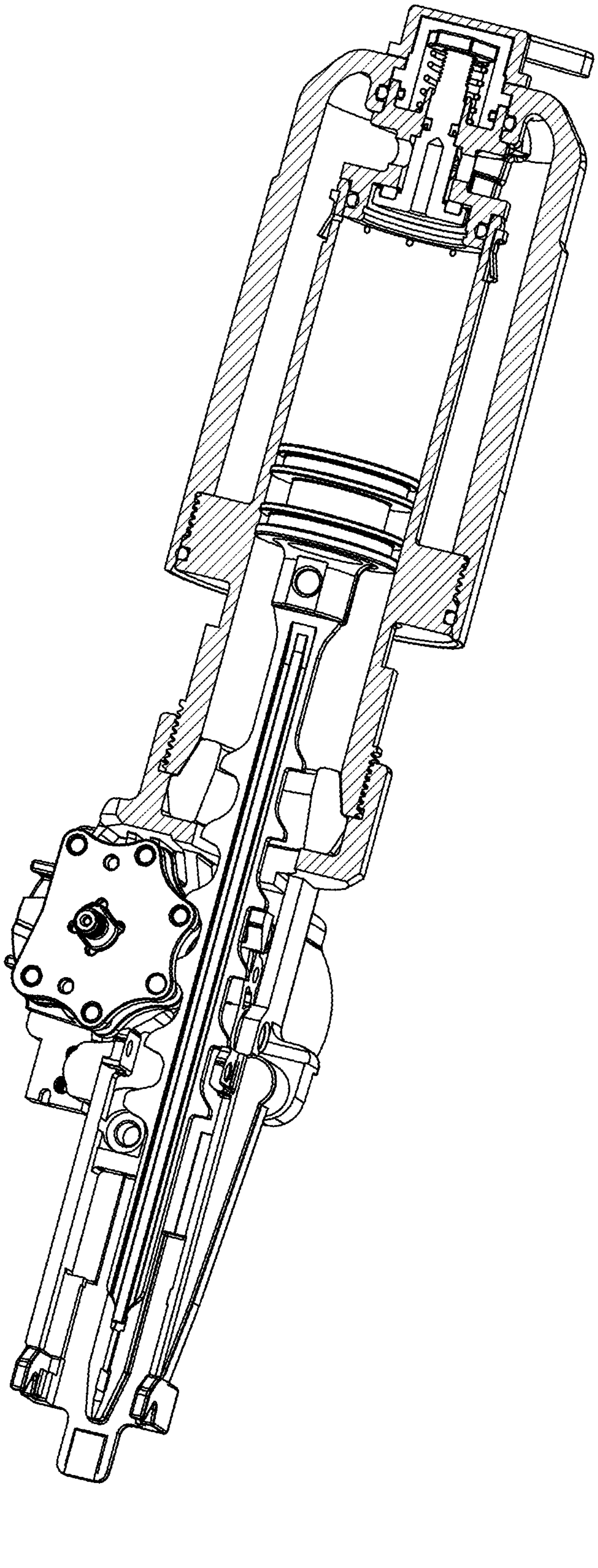
FIG. 16 is the schematic diagram of the invention in reset state of the drive blade.
Figure 17:
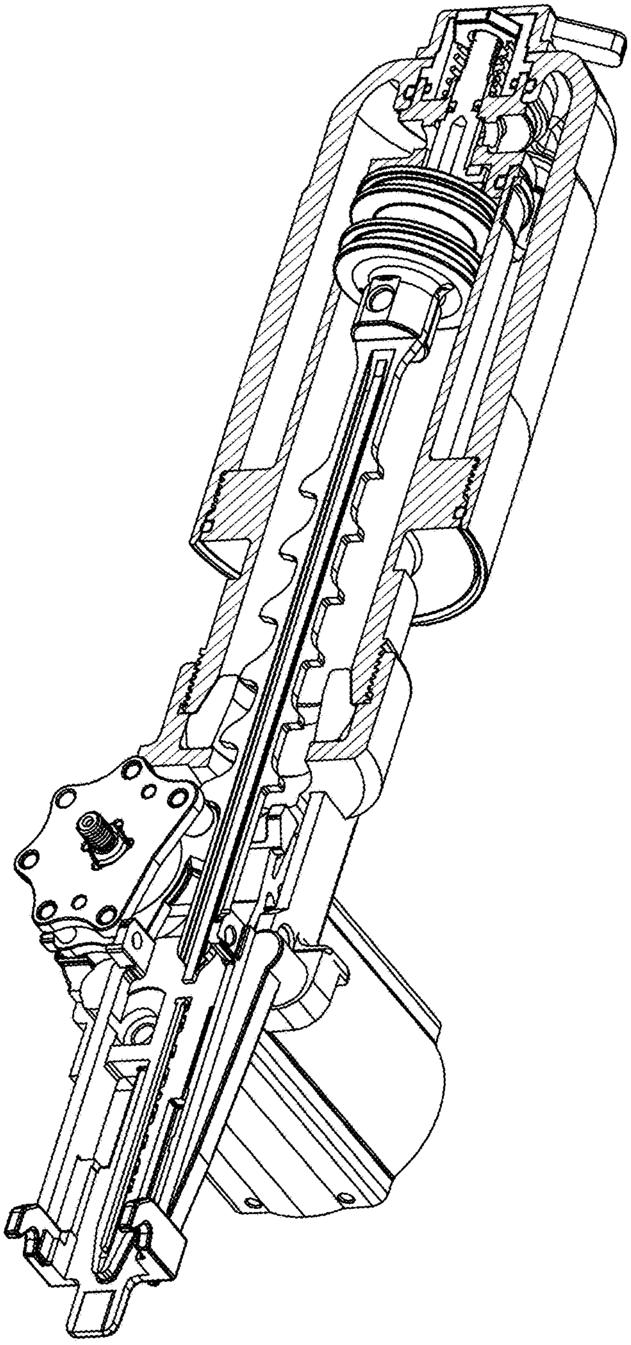
FIG. 17 is the schematic diagram of the invention in reset end state of the drive blade.

As shown in FIG. 9 to FIG. 11, the invention also comprises a latch mechanism 33, which is arranged on one side of the lifter 27; a cam lobe 34 protruding along the radial direction is arranged at the lower part of the lifter 27; second clamping teeth 35 distributed at intervals are arranged on the second side of the drive blade 7; the latch mechanism 33 comprises a latch fixing plate 36 installed in the housing 1, a latch body 37 installed on the latch fixing plate 36, a latch transmission arm 38 installed on the latch body 37, and a torsion spring 39 arranged between the latch body 37 and the latch transmission arm 38; the latch body 37 can rotate relative to the latch fixing plate 36, and at least part of the latch body 37 extends to the second clamping teeth 35; the latch transmission arm 38 is fixedly connected to the latch body 37, and the latch transmission arm 38 extends to the cam lobe 34; when the cam lobe 34 rotates and moves along with the lifter 27 to drive the drive blade 7, the cam lobe 34 pushes the latch transmission arm 38 to disengage the latch body 37 from the second clamping teeth 35 and compresses the torsion spring 39; after the drive blade 7 is activated, the cam lobe 34 rotates and moves along with the lifter 27 to disengage from the latch transmission arm 38, and the torsion spring 39 drives the latch body 37 to return to the original position.

To further enhance the use safety of the tool, a latch mechanism 33 is added. The specific usage process is as follows: after the tool completes driving, the drive blade 7 and the piston 6 are located at the bottom dead center (that is, the piston 6 is located at the front end of the first cylinder barrel 5), the lifter 27 continues to rotate, and then the clamping corners 30 on the lifter 27 move to be engaged with the first clamping teeth 29 at the top of the drive blade 7, and the lifter 27 begins to push the drive blade 7 and the piston 6 to complete the reset stroke (that is, the drive blade 7 and the piston 6 move upward from the bottom dead center to the top dead center). During the upward reset process of the drive blade 7, a plurality of second clamping teeth 35 on the right side thereof move upward along with the drive blade 7. The second clamping teeth 35 of the drive blade 7 can slide along the latch body 37 to drive the latch body 37 to compress the torsion spring 39 and push away the engagement of the latch body 37 with the second clamping teeth 35. As the drive blade 7 gradually resets, the latch body 37 is gradually disengaged with the second clamping teeth 35. The latch body 37 is engaged step by step on the second latch tooth 35, which can prevent the driving of the drive blade 7.

This locking action of the latch mechanism 33 has more than one benefit. On the one hand, when the piston 6 is lifted to the ready position, the latch body 37 is engaged with the second clamping tooth 35 and remains in the interference position. Before the latch body 37 is removed, the drive blade 7 cannot be driven. As mentioned above, the drive blade 7 can be driven only after the latch body 37 is disengaged with the second clamping tooth 35. On the other hand, if the drive blade 7 fails to complete the stroke completely during the driving process due to blockage or improper use of the tool, the latch body 37 can also prevent accidental driving at inappropriate times. This design makes the tool safer.

The specific action process is described below, as shown in FIG. 12 to FIG. 17.

The fastener feeding mechanism 16 moves the fastener to the driving position of the drive blade 7. According to the actual usage scenario, the user controls the compression amount of the first spring 21 by the nut inside the first adjusting knob 22 and the opening pressure of the first valve core 20 by turning the first adjusting knob 22. At this point, the clamping corners 30 of the lifter 27 are engaged with the first clamping teeth 29 at the lowest end of the drive blade 7. Meanwhile, the latch body 37 of the latch mechanism 33 is engaged with the second clamping teeth 35 under the force of the torsion spring 39 and is in the ready position. After the user presses the trigger 3, the lifter 27 rotates counterclockwise to continue driving the drive blade 7 to move upward. Meanwhile, the cam lobe 34 on the lower end surface of the lifter 27 rotates to the position of the latch transmission arm 38 of the latch body 37. The clamping corners 30 of the lifter 27 are disengaged from the first clamping teeth 29 of the drive blade 7. The cam lobe 34 rotates and pushes the latch transmission arm 38 to drive the latch body 37 to rotate and disengage from the second clamping teeth 35. When the gas in the second cylinder barrel 8 and the first cylinder barrel 5 pushes the piston 6 and the drive blade 7 to the bottom-dead-center, the fastener is driven into the workpiece, and the drive blade 7 completes the driving process. The piston 6 no longer moves downward. The volume of the first cylinder barrel 5 no longer increases. At this point, the second cylinder barrel 8 replenishes gas into the first cylinder barrel 5, and the air pressure inside the first cylinder barrel 5 rapidly approaches that inside the second cylinder barrel 8. When the thrust generated by the pressure difference between the second cylinder barrel 8 and the first cylinder barrel 5 on the first valve core 20 is less than the opening pressure of the adjustable check valve 11, the first valve core 20 is closed under its own opening pressure. The compressed gas in the second cylinder barrel 8 no longer enters the first cylinder barrel 5 through this channel. The first cylinder barrel 5 and the second cylinder barrel 8 are in an isolated state.

The lifter 27 does not stop rotating during the rapid downward driving of the drive blade 7 as the process that the drive blade 7 completes the downward firing is very short (only a few milliseconds). The notch 31 provided on the lifter 27 can prevent the clamping corner 30 on the lifter 27 from contacting the first clamping tooth 29 at the top of the drive blade 7 when the drive blade 7 linearly moves from the top-dead dead-center (TDC) position to the bottom-dead-center (BDC) position under the action of compressed gas. Therefore, the lifter 27 does not interfere with the driving process of the drive blade 7.

During the process that the lifter 27 pushes the drive blade 7 and the piston 6 to move upward, the clamping corners 30 of the lifter 27 are engaged with the first clamping teeth 29 of the drive blade 7 to drive the drive blade 7 to move upward and reset when the lifter 27 rotates counterclockwise. During this process, as the piston 6 moves upward, the volume of the first cylinder barrel 5 keeps decreasing and the air pressure inside the first cylinder barrel 5 keeps increasing. At this time, the adjustable check valve 11 is closed under its own opening pressure. When the air pressure inside the first cylinder barrel 5 is compressed by the piston 6 to be greater than that inside the second cylinder barrel 8, the compressed gas inside the first cylinder barrel 5 flows through a plurality of through holes 17 at the tail and opens the sealing sleeve 18 on the through holes 17 (i.e., the single channel is opened) to enter the second cylinder barrel 8 until the drive blade 7 and the piston 6 are pushed to the prepared position.

After the photoelectric sensor 32 is activated, the control circuit board 2 controls the motor 25 to stop outputting, and the lifter 27 stops rotating, completing one driving cycle and entering the ready position for the next driving.

The above does not impose any limitation on the technical scope of the invention. Any modifications, equivalent variations, and refinements made to the above embodiments based on the technical essence of the invention still fall within the scope of the technical proposals of the invention.

The invention claimed is:

1. An output energy adjustable gas spring fastener drive tool, comprising:

a housing comprising an installation space;

a control circuit board disposed in the housing and configured to receive and output signals;

a trigger disposed on the housing and configured to operate the drive tool;

a first cylinder block assembly comprising a first cylinder barrel for storing compressed gas, a piston disposed in the first cylinder barrel, and a drive blade disposed on the piston;

a second cylinder barrel configured to store compressed gas; and a pressure regulating device comprising a channel disposed between the first cylinder barrel and the second cylinder barrel and configured to flow the compressed gas in the first cylinder barrel to the second cylinder barrel, and an adjustable check valve disposed between the first cylinder barrel and the second cylinder barrel and configured to flow the compressed gas in the second cylinder to the first cylinder barrel;

wherein the channel comprises a plurality of through holes disposed around an inner wall of an upper end of the first cylinder barrel and a sealing sleeve disposed on an outer wall of the upper end of the first cylinder barrel; and wherein when a pressure of the compressed gas in the first cylinder barrel is greater than that in the second cylinder barrel, the compressed gas in the first cylinder barrel opens the sealing sleeve and enters the second cylinder barrel.

2. The output energy adjustable gas spring fastener drive tool of claim 1, wherein:

the adjustable check valve comprises a first valve body, a first valve core disposed in the first valve body, a first spring disposed at an end of the first valve core, and a first adjusting knob disposed at the end of the first valve core;

the first valve body comprises a valve hole connected to a second cylinder body, and a threaded section disposed at an upper end of the first valve core;

the first spring is sleeved on the first valve core, and the first adjusting knob is threadedly connected to the threaded section; and the first adjusting knob is driven by an external force to adjust and compress the first spring, thereby changing a cracking pressure exerted by the first valve core relative to the first valve body.

3. The output energy adjustable gas spring fastener drive tool of claim 1, further comprising:

a plurality of spaced first clamping teeth disposed on a first side of the drive blade;

a lifting mechanism disposed in the housing, the lifting mechanism comprising a motor, a gearbox connected to an output end of the motor, a lifter connected to the gearbox, the lifter including a clamping corner engaged with the first clamping teeth and a notch for avoiding a linear movement of the drive blade from a top-dead-center (TDC) position to a bottom-dead-center (BDC) position under the compressed gas at a circumferential edge, and a baffle disposed on an end face of the lifter;

a photoelectric sensor fitted with the baffle and disposed in the housing;

a cam lobe protruding along a radial direction and disposed at a lower part of the lifter;

a plurality of spaced second clamping teeth disposed on a second side of the drive blade; and a latch mechanism disposed on one side of the lifter, the latch mechanism comprising a latch fixing plate disposed in the housing, a latch body disposed on the latch fixing plate, the latch body configured to rotate relative to the latch fixing plate, and at least a part of the latch body extending to the second clamping teeth, a latch transmission arm disposed on the latch body, the latch transmission arm fixedly connected to the latch body, and the latch transmission arm extending to the cam lobe, and a torsion spring disposed between the latch body and the latch transmission arm;

wherein when the cam lobe rotates and moves along with the lifter to drive the drive blade, the cam lobe pushes the latch transmission arm to disengage the latch body from the second clamping teeth and compresses the torsion spring; and after the drive blade is activated, the cam lobe rotates and moves along with the lifter to disengage from the latch transmission arm, and the torsion spring drives the latch body to return to an original position.

* * * * *